March 29, 1966 D. E. LAUX 3,243,524

PHONOGRAPH PICKUP WITH RESILIENTLY LOADED STYLUS BEAM

Filed July 5, 1962

INVENTOR.
DAVID E. LAUX
BY
Eugene M. Whitacre
Attorney

United States Patent Office 3,243,524

Patented Mar. 29, 1966

3,243,524
PHONOGRAPH PICKUP WITH RESILIENTLY LOADED STYLUS BEAM

David E. Laux, Indianapolis, Ind., assignor to Radio Corporation of America, a corporation of Delaware Filed July 5, 1962, Ser. No. 207,496
2 Claims. (Cl. 179—100.41)

The present invention relates to phonograph pickups, and more particularly to piezo-electric and like phonograph pickup devices which normally utilize transducer elements having a relatively high mechanical impedance.

It is a primary object of this invention to provide an improved phonograph pickup of the piezo-electric type of practical design and adaptable for use in stereophonic, as well as monophonic, phonographs and other record-playing apparatus.

It is also an object of this invention to provide an improved phonograph pickup which is adapted for achieving improved performance with piezo-electric and like transducer elements having relatively high mechanical impedance, and which pickup is substantially equal in performance to known commercial magnetic phonograph pickups.

Piezo-electric transducer elements, as used in phonograph pickup devices, are inherently relatively stiff and of relatively high mass, and therefore operate effectively to offer a relatively high mechanical impedance to the pickup stylus in operation. It is desirable that the mechanical impedance, which includes the mass, stiffness and resistance included in the moving system which drives the transducer means, as measured at the stylus tip, should be as low as possible. Resistance, which includes friction and heat effects, is present in all pickups in varying degrees. In any phonograph pickup, stiffness in the moving system, to a gerater extent, affects the performance at the low-frequency end of its operating range, while mass in the moving system, to a greater extent, affects the performance at the high-frequency end thereof.

To improve the performance of the pickup, the mechanical impedance of the moving system as measured at the stylus tip should be as low as possible. The effects of the inherent stiffness, mass and resistor should be reduced to accomplish this. Theoretically, at least, the record groove is the only thing that should influence the movement of the pickup stylus for improved fidelity of operation in any phonograph record-reproducing system, and the associated pickup elements in no way should resist this movement. In this way a recording in a record groove can be translated faithfully into corresponding signal output from the pickup device, whether of the monophonic or stereophonic type.

It is, therefore, a further object of this invention to provide an improved moving or driving system between stylus and transducer elements, of ceramic type and other piezo-electric pickup devices, for reducing the effects of the inherent stiffness and mass of the transducer elements on the performance of such pickup devices.

It is a still further object of this invention to provide an improved driving system between stylus and transducer elements of ceramic type and other piezo-electric pickup devices for reducing the mechanical impedance at the stylus element to a low value without involving undesired resonance effects in the stylus arm or beam connected therewith.

In piezo-electric and like relatively stiff phonograph pickup devices, a relatively-small and low-mass stylus, is mounted to project in a radial and forward direction from the front end of a small light-weight stylus beam or arm. The opposite end of the stylus beam or arm may be provided with substantially fixed pivot means whereon the beam, or arm in this case, moves as a lever as the stylus follows a recording. Intermediate between the ends of the stylus arm, mechanical connection is made through a link element or yoke to drive the transducer element or elements of the pickup device as the beam vibrates in response to stylus movement.

It is known, in this type of mechanical drive system, to extend the length of the forward portion of the stylus beam, between the stylus and the transducer load at the yoke or link element, for increased leverage to reduce the loading or mechanical impedance at the stylus. However, increasing the leverage by increasing the length of the forward end of the stylus beam in this manner tends to bring the stylus resonance down to a frequency in the useful operating range of the pickup and is undesirable for that reason.

In accordance with the invention, the rear end of the stylus beam is resiliently loaded and is movable, instead of being fixedly mounted in a "pivot block." To provide this loading and movement, the rear end of the stylus beam is mounted in or connected with resiliently movable loader means comprising, in one embodiment, a block or element of flexible material attached to a fixed portion of the pickup structure. The loader means allows the stylus to rock or teeter about the transducer load point or yoke in the plane of the stylus movement.

In operation, the loader block or element deforms or bends and the rear pivot end of the stylus beam is permitted to shift in position. With this drive system the effective operating hinge or pivot for the stylus beam moves, or is free to move, from a normal or initial physical position at the rear end of the stylus beam, outside of the loader block and forwardly along the stylus beam to approach the fulcrum or driving connection for the transducer load. The operative lengths of the forward and rear sections of the beam change in ratio, and this has the effect of reducing the mechanical impedance of the pickup driving system without introducing distortion that would follow from physical elongation of the stylus beam as heretofore practiced as an expedient for reducing the stylus load or mechanical impedance effects.

The degree of increase of compliance or reduction in impedance in the pickup driving system is a function of the resiliency of the material in the loader block. By proper choice of the vertical and lateral dimensions of the loader block, the vertical and lateral compliances of the driving system can be controlled. To provide equal vertical and lateral compliances as seen by the stylus point, the compliance contribution provided by the loader block should be greater in the vertical direction than in the lateral direction, since additional lateral compliance is provided by torsional deformation of the stylus beam. The greater vertical compliance may be effected by making the loader block of a greater lateral dimension than vertical dimension.

The invention will be further understood from the following description, when considered in connection with the accompanying drawing, and its scope is pointed out in the appended claims.

Figure 2:
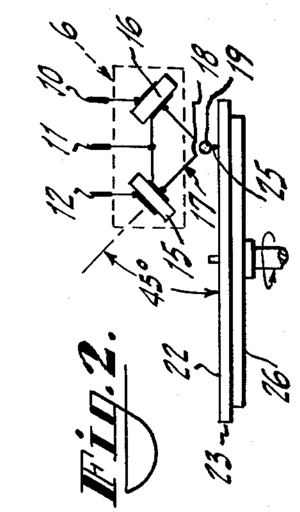
FIGURE 2 is a schematic end-view representation of the pickup of FIGURE 1 showing its electrical elements and connections therefor, together with its operating relation to a stereophonic record.
Figure 1:
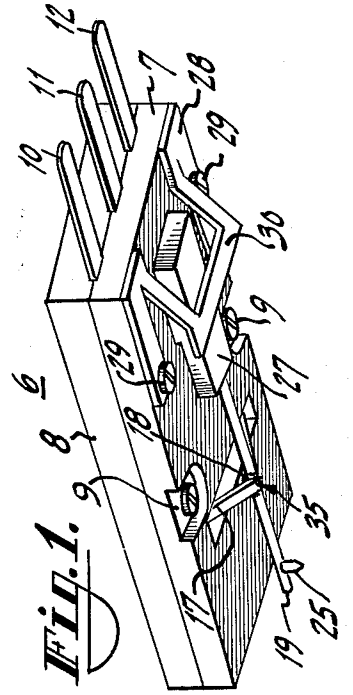
FIGURE 1 is an enlarged bottom view, in perspective, of a stereophonic phonograph pickup embodying the invention.

Referring to the drawing, wherein like reference characters are used to designate the same components throughout, and referring particularly to FIGURES 1 and 2, a phonograph pickup or pickup cartridge 6, adapted for stereophonic record reproduction when mounted in a suitable tone arm of record-playing equipment, is indicated in its normal operating position. The pickup includes a suitable casing comprising, for example, a pair of molded plastic base and cover sections 7 and 8, respectively, adapted to be fastened together in complementary relation as an enclosure for the interior transducer elements thereof. The pickup casing is provided with a pair of recessed holes 9 for receiving tone-arm mounting screws, and electrical connections with the pickup are made through terminals 10, 11 and 12 which project from the rear end of the cartridge 6.

The transducing mechanism of the pickup, which as noted is of the sterephonic or two-channel type in the present example, comprises a pair of piezo-electric transducing elements 15 and 16 which are mounted in the pickup casing so that the major surfaces thereof lie in planes that intersect at a right angle, as indicated in FIGURE 2 more particularly. The transducing elements are coupled to a driving yoke member 17 that may be of conventional construction with a re-entrant portion 18 for receiving and contacting the stylus arm 19 of the pickup, whereby the vibrations imparted to the stylus arm by the record-groove may be transmitted to the transducing elements. The axes of the yoke branch or leg connections with the transducer elements 15 and 16 lie at the usual angles of 45 degrees with respect to the record surface when the pickup is in operation.

The forward end of the stylus beam 19 is provided with a relatively-small low-mass stylus 25 which is mounted to engage and track the record-groove in the playing surface 22 and transmit the undulations of the two sides of the record-groove to the respective transducer elements 15 and 16 for stereophonic two-channel sound reproduction as the turntable 26, on which the record is placed, turns at the required speed in the direction indicated.

The opposite or rear end of the stylus beam is connected with resiliently-movable loading means of non-rigid material. This may be an elongated body or block 27, of rubber or like elastic material, attached to the fixed supporting structure of the pickup, such as the casing base element 7 in the present example. The block is clamped at its rear end by spring-clip means 28 which is attached to the casing base element by suitable screws 29 as indicated. The spring-clip or clamping means includes a resilient spring bar element 30 engaging the block 27 transversely thereof and above the point of contact with the base element 7.

The forward end of the block 27, with which the rear end of the stylus beam is connected, is free to move flexibly with pivotal movement of the stylus beam and, in the present example, for this purpose is relieved from contact with the base as indicated at 31 and elongated forwardly of the holding means 30 to the point of connection with the stylus beam. This type of mount also permits the stylus, stylus beam, and loading block 27, as a unit, to readily be removed from the pickup for replacement purposes, by lifting the spring-clip bar 30 sufficiently to permit the block to be released. The new unit is placed in position with the stylus beam 19 engaging the yoke 17 in the position shown. The spring bar 30 is released to grip the loading block and hold the unit in place.

Figure 3:
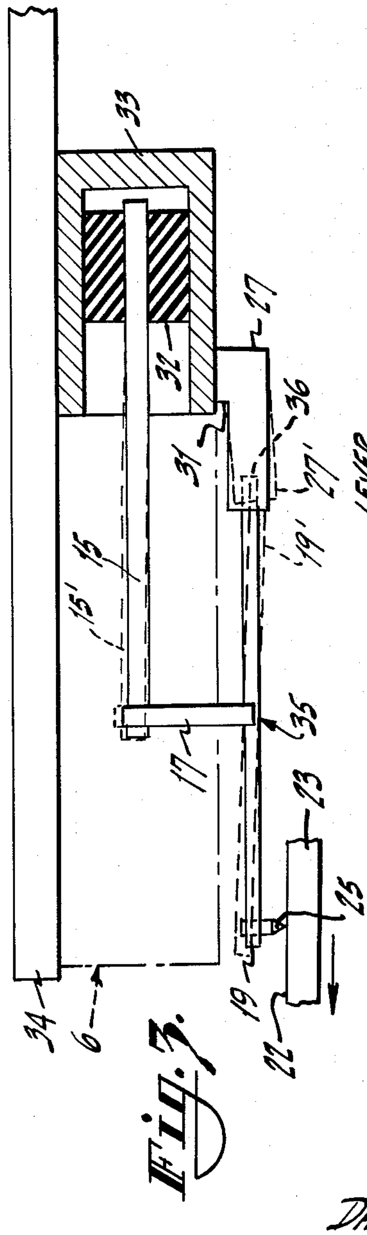
FIGURE 3 is an enlarged schematic side-view, in elevation and partly in section, of the pickup shown in FIGURES 1 and 2, illustrating the operation thereof.

Referring now to FIGURE 3 along with the preceding figures, the action of the stylus for driving the transducer elements will be considered in greater detail. To simplify the description and to facilitate an understanding of the driving system and its features, operation of only one of the transducer elements along its operating axis or plane through the yoke 17 need be considered as both are alike and operate in the same manner. The element 15 is chosen by way of example for this purpose.

The transducer element 15 is of the piezo-electric type in elongated or rod-like form, fixed at the rear end in a suitable mounting block 32 carried by a fixed supporting element 33 forming part of the pickup structure. The pickup is attached to the forward end of a suitable tone arm 34 as indicated. The rear end of the piezo-electric transducer element 15 is held in the mounting block 32 in the pickup casing, and the forward or free end as the movable operating element of the transducer means is connected with one branch or leg of the yoke 17 as the driving connection or link with the stylus arm 19 at the point designated at 35. The stylus 25 is mounted at the forward end of the arm 19 and the rear or normal pivot end 35 of the stylus beam is connected with, and as shown is embedded in, the free forward end of the loader block 27. The stylus and rear ends of the stylus beam thus provides oppositely-movable points and respond to opposing forces in the plane of movement of the stylus. The load of the transducer element or elements is applied to the stylus beam at the point 35, and this load is moved by the stylus as it follows the recording in the record-groove. The operational movement thus imparted to the transducer element 15 is indicated by the dotted outline 15'.

Figure 4:
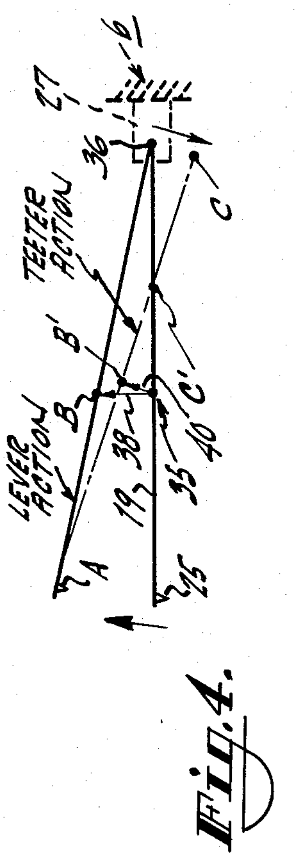
FIGURE 4 is a diagrammatic representation of the operative relation of certain of the parts of the schematic representation of FIGURE 3, further illustrating operational features of the pickup.

When the stylus beam 19 is moved as indicated by the dotted outline 19', the loader block 27 is caused to flex or move as indicated by the dotted position 27', and thus the rear pivot end of the stylus beam is shifted by this action as will further be seen from a consideration of the diagram of FIGURE 4.

In the diagram, movement of the stylus beam 19 is depicted as being greater than under the actual operating conditions in order to illustrate the action more effectively. Operation of prior art devices and operation of the embodiment shown are illustrated in the diagram. Here, the stylus 25 is assumed to be moved from an initial position to the position A in response to record-groove modulation, pivoting on the stylus beam 19 about the rear pivot end or axis 36 in a predetermined direction or plane to operate the transducer element. This is a normal "lever" action of known pickups and is designated by the legend, "Lever Action" applied to the new position of the stylus beam. The pivot 36, in this case, is fixed or semi-rigid and effectively does not move. Thus the driving connection at the point 35, with the connecting link or yoke for the transducer load, may rise to a position B over a distance indicated by the arrowed line 38. The mechanical impedance at the stylus 25 by reason of the stiffness, and resistance of the moving system is relatively high.

If the rear end 36 of the stylus beam is permitted to move or shift, by reason of the flexible resilient loader means comprising the block 27, to a position C as the stylus moves to the position A, the stylus beam moves to a position indicated by the dot-and-dash line between the stylus position A and the pivot position C, and designated by the legend, "Teeter Action," in FIGURE 4. This brings the effective operating pivot point for the beam 19 to the point C' and the resultant movement of the yoke or transducer load is over a shorter distance as indicated by the arrowed line 40, to the position B'. Thus the movement imparted to the yoke 17 is reduced, and the mechanical impedance seen by the stylus point is correspondingly reduced.

Therefore, the rear end 36 of the stylus beam 19 is not fixed, but is mounted to move relatively freely, so that the hinge or operating pivot C' for the beam effectively moves out of the flexible mounting block toward the stylus 25, whereas in the known lever system it remains substantially fixed. Here the operating pivot effectively moves from the position indicated at 36 to the position indicated at C'. The length of the forward portion of the stylus beam in relation to the length of the rear portion thereof to the effective pivot point rapidly changes. This action retains the advantage of a relatively-short stylus beam forward of the transducer load point, while achieving a large mechanical impedance reduction at the stylus.

The point at which the effective pivoting action of the stylus beam 19 occurs willl be determined by the resiliency of the loading means 27. As the loading means 27 is made more resilient, the effective pivoting point moves toward the yoke 17, and conversely as the loading means 27 is made less resilient the effective pivoting point moves toward the rear end 36 of the stylus beam 19.

In stereophonic pickups, to provide maximum separation between the stereophonic signal channels, it is desirable that the vertical and lateral compliances be substantially equal. It will be noted from FIGURE 3 that lateral forces on the stylus tip 25 in addition to pushing the stylus beam 19 sideways or laterally, will tend to twist the stylus beam 19. This twisting action does no useful work insofar as the transmission of motion to the piezo-electric elements 15 and 16, and appears as a compliance component in the lateral direction but not in the vertical direction. To make the vertical and lateral compliances equal, the loading means 27 can be formed of a block of rubber or other resilient material which has a greater lateral dimension, than vertical dimension, thus providing a greater compliance in the vertical direction than in the lateral direction. The relative vertical lateral compliances are such that the total of the compliance components in the lateral direction is substantially equal to those in the vertical direction. It is clear that the loading means 27 may be of a configuration to provide any desired relationship between the lateral and vertical compliances.

The phonograph pickup of the invention thus provides means for reducing the mechanical impedance, or increasing the mechanical compliance, as seen by the groove tracing stylus member and hence, permits the construction of pickups capable of high performance reproduction of phonograph records.

What is claimed is:

1. A stereophonic phonograph pickup comprising in combination:

a support member for said pickup, an electromechanical transducer structure mounted on said support member, a resilient member having a stylus receiving portion and a mounting portion, means for holding the mounting portion of said resilient member in a relatively fixed position with respect to said support member with said stylus receiving portion extending, free of obstruction, for flexural movement in vertical and lateral directions relative to said mounting portion, an elongated stylus beam having a record engaging stylus tip at one end and the other end embedded in the stylus receiving portion of said resilient member, and means coupling said transducer structure to a point intermediate the ends of said stylus beam, the vertical and lateral dimensions of the stylus receiving portion of said resilient member being dimensioned so that the vertical and lateral compliance of the pickup, as measured from said stylus tip, are substantially equal.

2. A stereophonic phonograph pickup as defined in claim 1 wherein the lateral dimension of the stylus receiving portion of said resilient member is greater than the vertical dimension thereof.

References Cited by the Examiner

UNITED STATES PATENTS 2,934,610 4/1960 Dieter ---------- 179—100.41

OTHER REFERENCES

German printed application No. 1,090,442, Freise, published Oct. 6, 1960.

BERNARD KONICK, *Primary Examiner.*

IRVING L. SRAGOW, *Examiner.*

J. P. SCHERLACHER, *Assistant Examiner.*